US007832654B2

(12) United States Patent
Xu et al.

(10) Patent No.: US 7,832,654 B2
(45) Date of Patent: Nov. 16, 2010

(54) DEVICE AND METHODS FOR DISPERSING MULTIPHASIC MATERIALS

(75) Inventors: Xiaobin Xu, Nanning (CN); Shujian Gan, Nanning (CN); Ribao Qin, Nanning (CN); Jinhui Huang, Nanning (CN)

(73) Assignee: Pharmaceutical Factory of Guangxi Traditional Chinese Medical University, Nanning, Guangxi (CN)

( * ) Notice: Subject to any disclaimer, the term of this patent is extended or adjusted under 35 U.S.C. 154(b) by 38 days.

(21) Appl. No.: 12/207,576

(22) Filed: Sep. 10, 2008

(65) Prior Publication Data

US 2009/0050706 A1 Feb. 26, 2009

Related U.S. Application Data

(63) Continuation of application No. PCT/CN2007/000769, filed on Mar. 9, 2007.

(30) Foreign Application Priority Data

Mar. 10, 2006 (CN) ........................ 2006 1 0018540

(51) Int. Cl.
*A01G 25/09* (2006.01)
*A62C 13/62* (2006.01)

(52) U.S. Cl. ........................... 239/1; 239/306; 239/332; 239/333; 239/414; 239/415; 239/416.5; 239/417.5; 239/418; 239/433; 222/136; 222/145.5; 222/333; 222/304

(58) Field of Classification Search ................. 239/303, 239/304, 306, 329, 332, 333, 407, 413, 414, 239/415, 416.5, 417.5, 398, 418, 433, 1; 222/136, 137, 145.5, 333, 383.1
See application file for complete search history.

(56) References Cited

U.S. PATENT DOCUMENTS 5,332,157 A * 7/1994 Proctor ........................ 239/304
5,562,250 A * 10/1996 O'Neill ...................... 239/304
5,857,591 A * 1/1999 Bachand ..................... 239/306
6,550,694 B1 * 4/2003 Foster et al. ................ 239/304

FOREIGN PATENT DOCUMENTS

CN 1686262 * 10/2005

* cited by examiner

*Primary Examiner*—Steven J Ganey
(74) *Attorney, Agent, or Firm*—Matthias Scholl P.C.; Matthias Scholl

(57) ABSTRACT

A spraying device for multiphase material, comprising: a cylinder, a pair of liquid-conveying pipes, a pair of material-conveying pipes, a nozzle, a pair of switches, at least one pair of storage chambers, a pair of valves, a mixing chamber, and a conveying pump; wherein the conveying pump is connected to the storage chambers via the liquid-conveying pipes, the conveying pump, the switches and the valves control material transmission of the material-conveying pipes, the conveying pump is connected to the mixing chamber via the material-conveying pipes, and the mixing chamber is disposed in front of the nozzle.

13 Claims, 3 Drawing Sheets

DEVICE AND METHODS FOR DISPERSING MULTIPHASIC MATERIALS

CROSS-REFERENCE TO RELATED APPLICATIONS

This application is a continuation of International Patent Application No. PCT/CN2007/000769 with an international filing date of Mar. 9, 2007, designating the United States, now pending, and further claims priority benefits to Chinese Patent Application No. 200610018540.8 filed Mar. 10, 2006. The contents of all of the aforementioned applications, including any intervening amendments thereto, are incorporated herein by reference.

BACKGROUND OF THE INVENTION

1. Field of the Invention

The invention relates to a spraying device, and more particularly to a device for spraying multi-phase material, a method of spraying multi-phase material using the device, and applications thereof.

2. Description of the Related Art

Nowadays, spraying devices are widely used in the medical field. However, conventional spraying devices are adapted for spraying only one kind of medical agents, liquids or medical powders, are equipped with only one spraying switch, and do not meet the requirement for spraying two or more kinds of materials simultaneously.

SUMMARY OF THE INVENTION

In view of the above-described problems, it is one objective of the invention to provide a multi-phase material spraying device that can meet the requirement for spraying two or more kinds of materials simultaneously.

It is another objective of the invention to provide a method for spraying multi-phase material that can meet the requirement for spraying two or more kinds of materials simultaneously.

It is a further objective of the invention to provide a multi-phase material spraying agent that can meet the requirement for spraying two or more kinds of materials simultaneously.

In order to achieve the above objectives, in accordance with one embodiment of the invention, provided is a multi-phase material spraying device, comprising a cylinder, a pair of liquid-conveying pipes, a pair of material-conveying pipes, a nozzle, a pair of switches, at least one pair of storage chambers, a pair of valves, a mixing chamber, and a conveying pump. The conveying pump is connected to the storage chambers via the liquid-conveying pipes. The conveying pump, the switches, and the valves control material transmission through the material-conveying pipes. The conveying pump is also connected to the mixing chamber via the material-conveying pipes. The mixing chamber is disposed in front of the nozzle.

In a class of this embodiment or in another embodiment, the storage chambers are disposed separately or integrally.

In a class of this embodiment or in another embodiment, the conveying pump is an electric pump or a manual pump.

In a class of this embodiment or in another embodiment, the conveying pump is a metering pump or a non-metering pump.

In a class of this embodiment or in another embodiment, the switch is a press spring-type switch.

In a class of this embodiment or in another embodiment, the switch comprises a handle, a spring and a piston.

In a class of this embodiment or in another embodiment, the switch is a button switch.

In a class of this embodiment or in another embodiment, the switch is disposed on the handle and connected to the conveying pump and a power supply via electrical wires.

In a class of this embodiment or in another embodiment, a safety switch is disposed outside the device so as to control the valves.

In a class of this embodiment or in another embodiment, the valves are metering valves or non-metering valves.

In a class of this embodiment or in another embodiment, the safety switch has a plurality of settings and operates to control the valves to switch on separately or simultaneously.

In a class of this embodiment or in another embodiment, a steering valve or rifles are disposed on the nozzle.

In a class of this embodiment or in another embodiment, different materials are disposed in the storage chambers.

In accordance with another embodiment of the invention, provided is a multi-phase material spraying method, the method being applicable to a multi-phase material spraying device comprising a cylinder, a pair of liquid-conveying pipes, a pair of material-conveying pipes, a nozzle, a pair of switches, at least one pair of storage chambers, a pair of valves, a mixing chamber and a conveying pump, and the method comprising steps of: opening the valve and pressing a handle of the switch, so that materials in the storage chamber enter the mixing chamber via the liquid-conveying pipe and are sprayed out from the nozzle; opening the valve and pressing the switch, so that materials in the storage chamber are sprayed out from the nozzle via the mixing chamber; and simultaneously opening the valves and pressing the switches, so that materials in the storage chambers enter the mixing chamber via the liquid-conveying pipes and are sprayed out from the nozzle.

In a class of this embodiment or in another embodiment, different materials are disposed in the storage chambers.

In accordance with a further embodiment of the invention, provided is a multi-phase material spraying agent, the agent being applicable to a multi-phase material spraying device comprising a cylinder, a pair of liquid-conveying pipes, a pair of material-conveying pipes, a nozzle, a pair of switches, at least one pair of storage chambers, a pair of valves, a mixing chamber and a conveying pump, wherein different materials are disposed in the storage chambers.

In a class of this embodiment or in another embodiment, the materials comprise dragon's blood fine powders, high concentration of dragon's blood solution, 45-95% v/v ethanol, and a blocking buffer. (Dragon's blood refers to a red, resinous substance obtained from the fruit of a climbing palm (*Daemonorops draco*) of tropical Asia.)

Advantages of the inventions include:

1) The problem of conventional spraying devices and methods is solved in that solid and a liquid ingredient of a drug can be mixed instantly before use so that drug decomposition resulting from advance mixing is avoided. Costs are saved since patients do not need to separately purchase solid and liquid drug components.
2) Different materials are stored in a plurality of storage chambers in the spraying device, and can be sprayed out separately or simultaneously after being uniformly mixed by the device. The device can be used for spraying multi-phasic drugs, disinfectants, pesticides, air fresheners, etc.
3) Liquid and solid materials are stored in the cylinder to form a multi-phase material spraying agent. A solid and a liquid spraying switches are disposed in the cylinder. A user can spray the liquid material first or the solid material second, or vice versa, or spray the liquid and solid materials simultaneously. The functions of disinfecting, enhancing adhesive force, and promoting infiltration are integrated.

4) The problems of poor storage stability of emulsion-type or suspension-type spray agents is solved by introducing separate storage chambers.

5) No additive comprising preservatives must be added, and the probability of chemical reaction between the materials and the additives during long-term storage is avoided.

6) The device solves problems with stability Chinese traditional medicine since ingredients in an extract of Chinese traditional medicines are complicated, and it is difficult to obtain good stability when an emulsifier, a compatibilizer, an antioxidant, or a surfactant is added.

7) Ethanol for disinfection can be stored in the storage chamber. Before spraying powders, a doctor or patient can first spray ethanol to an affected part, then spray the powders.

8) The problem of limited solubility of drugs is solved to an extent as drugs supplied in a single kit can be sprayed successively. Accordingly, more drugs can be marketed in combination.

9) The operation of embodiments of the invention is simple. The device provides technical solution for preparing complex drugs. The device is simple in operation and convenient in use.

BRIEF DESCRIPTION OF THE DRAWINGS

Detailed description will be given below with reference to accompanying drawings, in which.

DETAILED DESCRIPTION OF THE EMBODIMENTS

Figure 1:
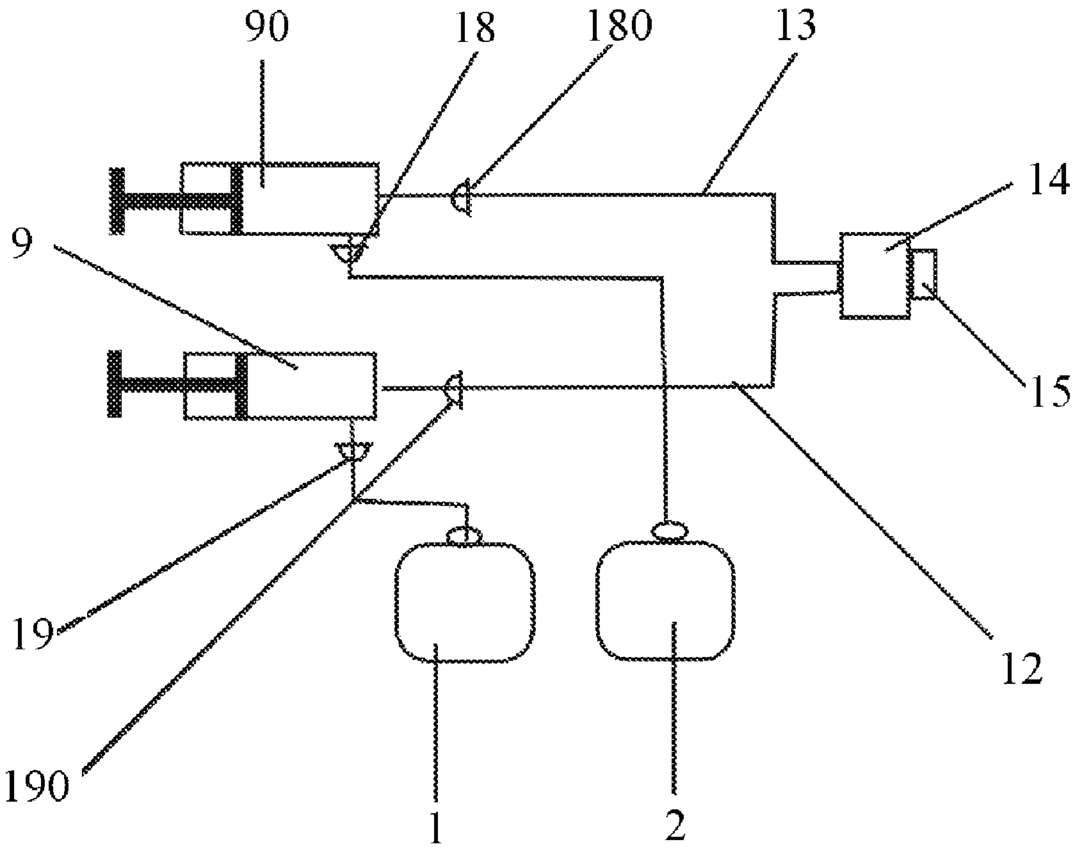
FIG. 1 is a schematic diagram of a multi-phase material spraying device in accordance with one embodiment of the invention.

As shown in FIG. 1, a first storage chamber 1 and a second storage chamber 2 are disposed on a cylinder. An outlet of the first storage chamber 1 is connected to a first valve 19 and a first conveying pump 9 via a conveying pipe, then to a mixing chamber 14 via a first material-conveying pipe 12 and a valve 190, and finally to a nozzle 15. An outlet of the second storage chamber 2 is connected to a second conveying pump 90 via another conveying pipe and a second valve 18. The second conveying pump 90 conveys materials in the pipe to the mixing chamber 14 via a second material-conveying pipe 13, and then the nozzle 15 sprays the materials. A fourth valve 180 can be disposed on the second material-conveying pipe 13. An external safety switch with different settings controls the valves of the material-conveying pipes 12 and 13 to switch on separately or simultaneously, so as to facilitate selective spraying. Any one of the valves 19, 190, 18, 180 can also be freely selected and turned on or off.

Figure 2:
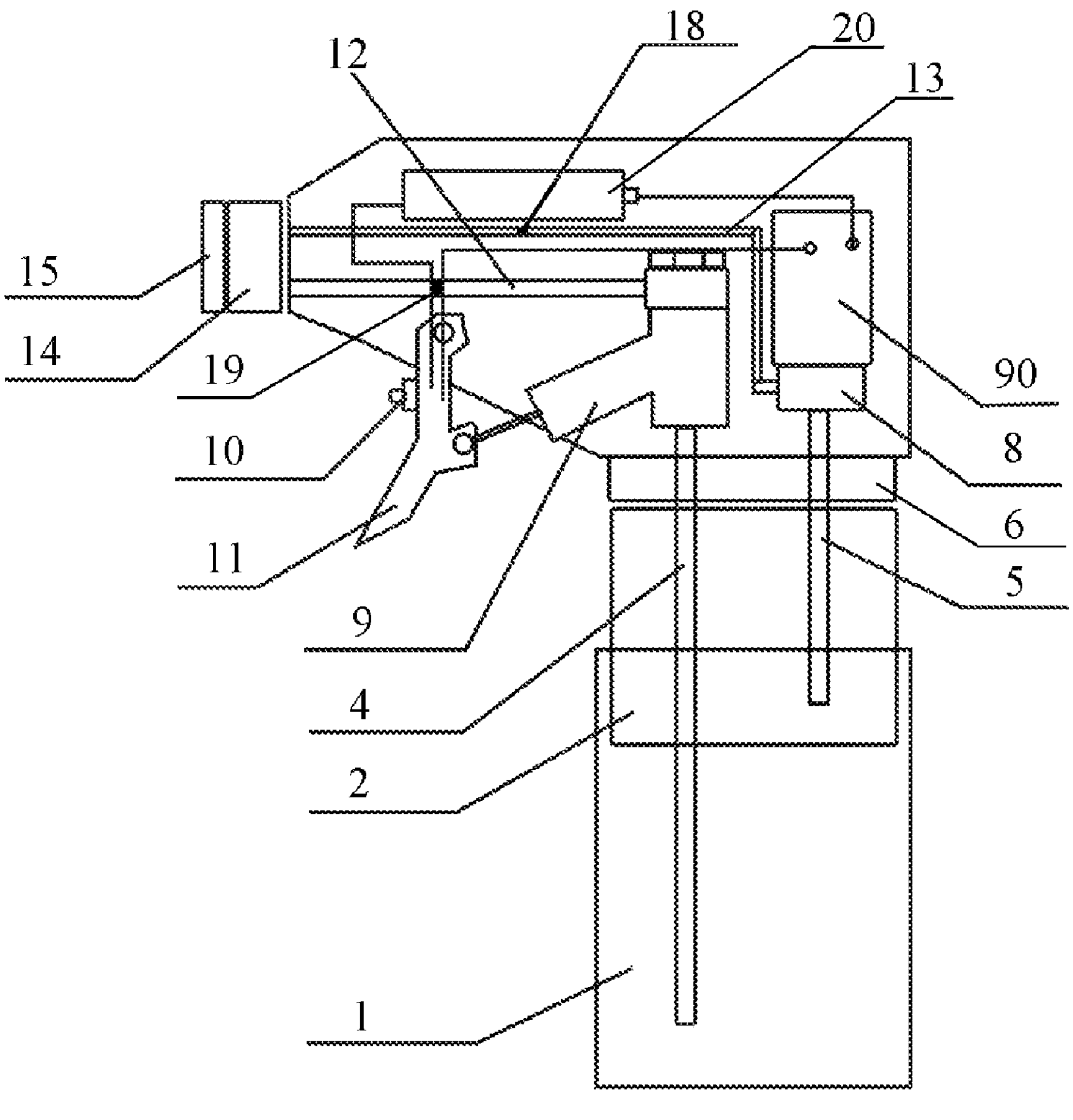
FIG. 2 is a structural diagram of a multi-phase material spraying device in accordance with one embodiment of the invention.

As shown in FIG. 2, in accordance with one embodiment of the invention, a device for spraying multi-phase material comprises a cylinder, a liquid conveying pipe 4, a solid conveying pipe 5, a nozzle 15, switches 10 and 11, and a cylinder cap. In the cylinder, a solid storage chamber 2 is disposed above a liquid storage chamber 1 (the two chambers can be separated or combined with a separator disposed in the middle). The cylinder cap 6 is disposed at the top of the cylinder. A battery box 20, a first conveying pump 9, a second conveying pump 90, and the switches 10 and 11 are disposed above the cylinder cap 6. The first conveying pump 9 is a manual pump and the second conveying pump 90 is an electric pump. An end of the liquid conveying pipe 4 is connected below the first conveying pump 9 and an end of the solid conveying pipe 5 is connected below the second conveying pump 90. The other end of the liquid conveying pipe 4 is inserted into the liquid storage chamber 1 and the other end of the solid conveying pipe 5 is inserted into the solid storage chamber 2.

A first material-conveying pipe 12 of the first conveying pump 9 and a second material-conveying pipe 13 of the second conveying pump 90 are connected simultaneously to a mixing chamber 14. The nozzle 15 is disposed in front of the mixing chamber 14. A first valve 19 disposed on the first material-conveying pipe 12 and a second valve 18 disposed on the second material-conveying pipe 13 control a flow volume of materials. Switches are disposed at an outlet of the first conveying pump 9 and the second conveying pump 90. One switch is a press spring-type switch 11, the other is a button-type switch 10, and the two switches are combined. The press spring switch 11 comprises a handle, a spring and a piston. The button switch 10 is disposed on the handle and connected to the electric conveying pump 90 and the battery box 20 via a wire to form a circuit.

A safety switch is disposed outside to control the first valve 19 and the second valve 18. A steering valve or rifles can be disposed on the nozzle 15. When a user turns the safety switch to a first setting, the first valve 19 disposed on the first material-conveying pipe 12 is switched on. When the handle of the press spring switch 11 is pressed manually, the piston departs and materials in the liquid storage chamber 1 enter the mixing chamber after passing through the liquid conveying pipe 4 and are sprayed out from the nozzle. When the handle is released, the spring returns to an original position automatically, and the piston closes to block the liquid conveying pipe. When the user turns the outside safety switch to a second setting, the valve 18 disposed on the second material-conveying pipe 13 is switched on. If only the button switch 10 is pressed, the power supply of the battery box 20 is connected to the electric pump and powders in a solid storage chamber 2 are extracted. Subsequently, the powders pass through the mixing chamber 14 and are sprayed from the nozzle 15.

When the user turns the outside safety switch to another setting, the first valve 19 disposed on the first material-conveying pipe 12 and the second valve 18 disposed on the second material-conveying pipe 13 are switched on simultaneously. After the user presses the press spring switch 11 and the button switch 10, the materials stored in the liquid storage chamber 1 and the solid storage chamber 2 enter the mixing chamber 14 via the first material-conveying pipe 12 and the second material-conveying pipe 13, and are then sprayed out from the nozzle 15.

Figure 3:
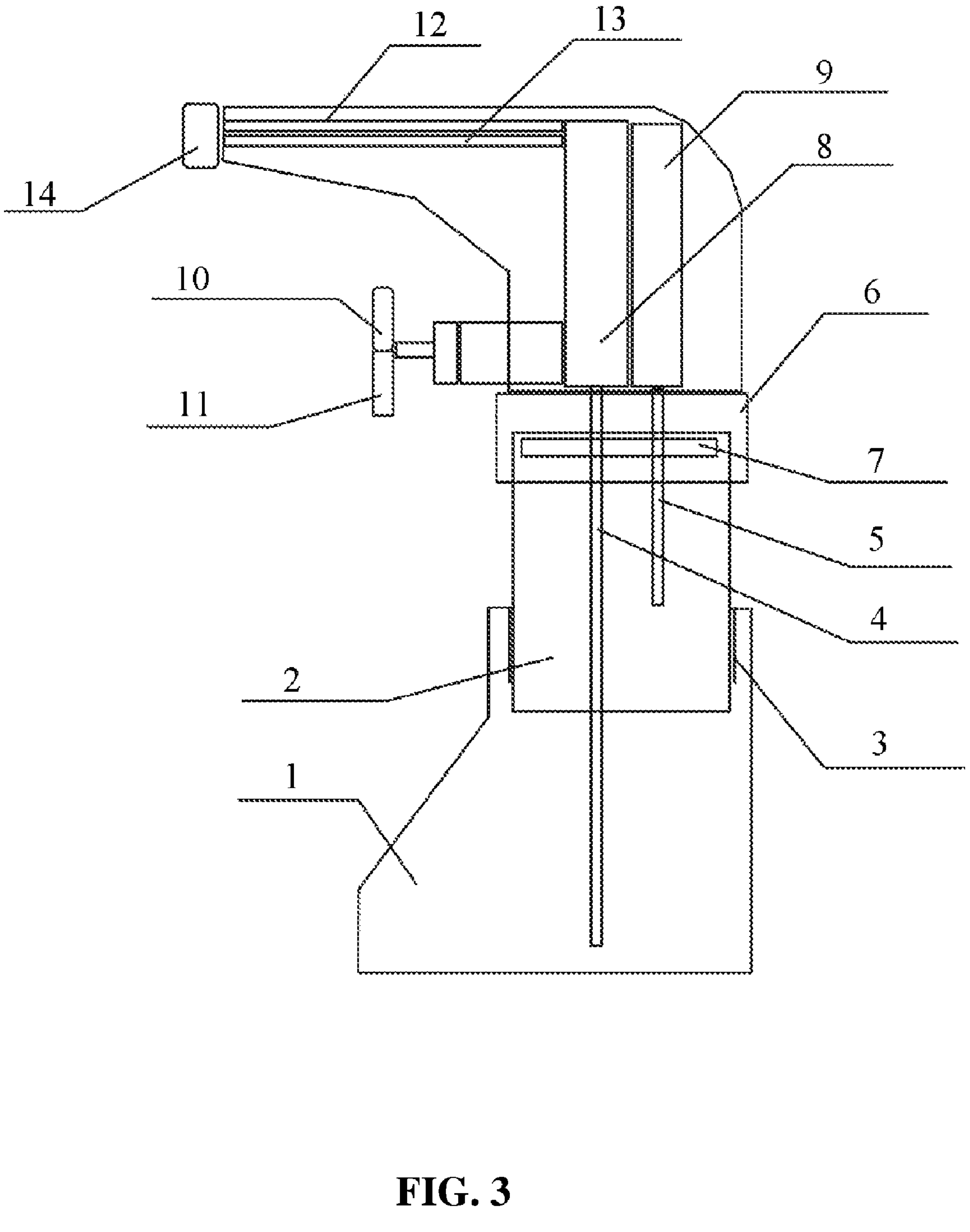
FIG. 3 is a structural diagram of a multi-phase material spraying device in accordance with another embodiment of the invention.

As shown in FIG. 3, a multi-phase material spraying device approximately similar to the device in FIG. 2 is mainly applied to liquid drugs, and comprises a cylinder, a first liquid conveying pipe 4, a second liquid conveying pipe 5, a first metering pump 8, a second metering pump 9, a nozzle 15, a first switch 10, a second switch 11, a mixing chamber 14 and a cylinder cap. The cylinder comprises a first liquid storage chamber 1 and a second liquid storage chamber 2. The cylinder cap 6 is disposed above the cylinder. The first metering pump 8, the second metering pump 9, the first switch 10 and the second switch 11 are disposed above the cylinder cap 6.

Below the first metering pump 8 and the second metering pump 9, a pump base is connected the first liquid conveying pipe 4 and the second liquid conveying pipe 5. The first liquid conveying pipe 4 and the second liquid conveying pipe 5 are respectively received in the first liquid storage chamber 1 and the second liquid storage chamber 2. A first material-conveying pipe 12 of the first liquid conveying pipe 4 and a second material-conveying pipe 13 of the second liquid conveying pipe 5 are connected to the mixing chamber 14. The nozzle 15 is disposed in front of the mixing chamber 14. The first switch 10 and the second switch 11 are respectively disposed at an outlet of the first metering pump 8 and the second metering pump 9. The first switch 10 and the second switch 11 can also be a press spring switch shown in FIG. 2 and comprising a handle, a spring and a piston.

In operation, as the handles of the first switch 10 or the second switch 11 is pressed, the piston departs and liquid stored in the first liquid storage chamber 1 or the second liquid storage chamber 2 enters the mixing chamber 14 via the first liquid conveying pipe 4 or the second liquid conveying pipe 5 and is then sprayed out from the nozzle 15. When the handle is released, the spring returns to an original position automatically, and the piston closes to block the liquid conveying pipe. When the handles of the first switch 10 and the second switch 11 are pressed simultaneously, materials stored the first liquid storage chamber 1 and the second liquid storage chamber 2 enter the mixing chamber 14 via the first liquid conveying pipe 4 and the second liquid conveying pipe 5 simultaneously and are sprayed from the nozzle 15.

Valves (not shown) can be disposed on the first liquid conveying pipe 4 and the second liquid conveying liquid 5, or on the first material-conveying pipe 12 and the second material-conveying pipe 13. The valves are pipeline valves employing metering pumps or non-metering pumps. The valves cooperate with a safety switch disposed outside having multiple settings, whereby making storage and transportation safe. When two kinds of materials need to be sprayed simultaneously, the outside safety switch is turned to another setting so as to conveniently operate the first switch 11 and the second switch 10. Alternatively, no valve is employed and materials are chosen by controlling the piston.

EXAMPLE 1

Multi-Phase Dragon's Blood Spraying Agent

Dragon's blood fine powders (less than 300 mesh, obtained after grinding the dragon's blood in a ball mil) are stored in a solid storage chamber 2. 70% v/v ethanol is stored in a liquid storage chamber 1. The ethanol can be sprayed out separately to sterilize if necessary. When a broken wound is treated, firstly ethanol and then the dragon's blood fine powders are sprayed out, or the dragon's blood fine powders are sprayed out directly to cure the wound. When a sprain injury is treated, ethanol and the dragon's blood can be sprayed out simultaneously, or first a small amount of ethanol is sprayed to wet the skin surface, and then the dragon's blood fine powders are sprayed. Sprayed ethanol increases adhesion of the dragon's blood.

EXAMPLE 2

Multi-Phase Dragon's Blood Spraying Agent 20-80% w/w solution of dragon's blood clear paste in 75% ethanol solution, is stored in a first chamber 1. See, Chinese Patent Publication No. CN 1552406A for a process of preparing the dragon's blood clear paste. A blocking buffer is stored in a second chamber 2. When a severe closed injury appears, the blocking buffer comprising a refrigerant and lidocaine can be sprayed out first. After five minutes a high concentration of dragon's blood is sprayed out. The high concentration dragon's blood can be sprayed out directly to treat a common injury.

EXAMPLE 3

Air Freshener

In an application to air fresheners, a lemon freshener is stored in a first chamber 1, and a silkweed freshener is stored in a second chamber 2. The lemon freshener and silkweed freshener can be sprayed separately or be sprayed simultaneously to form a mixed flavor freshener.

The lemon freshener comprises 0.4-1.2% lemon essence by weight, 97-99% distilled water by weight, and 2.0-3.5% ethanol by weight. The silkweed freshener comprises 0.2-0.7% mint essential oil by weight, 0.3-0.8% jasmine essential oil by weight, 95-99% distilled water by weight and 4-6% ethanol by weight. Important advantage of the above two fresheners is that fragrance type can be adjusted by choosing proportion according to personal preference.

Compared with dragon's blood powders, the multi-phase dragon's blood spraying agent of the invention has much higher bioavailability. Compared with common dragon's blood spraying agents, the multi-phasic dragon's blood spraying agent has a much wider application and has the function of sterilizing and treating. Open and closed wounds can be treated alike.

1) If sterilization is needed, 70% v/v ethanol iodine tincture is sprayed out. The ethanol iodine tincture has the function of sterilizing and cleaning.
2) When an open wound is treated, first the ethanol iodine tincture is sprayed to sterilize, then dragon's blood fine powders are sprayed out, which is beneficial to cure a wound.
3) When a sprain is treated, the ethanol and the dragon's blood can be sprayed out simultaneously, or firstly a small amount of the ethanol is sprayed to wet a skin surface, then the dragon's blood fine powders are sprayed. The ethanol iodine tincture increases adhesive force of the dragon's blood and promotes overall adhesion.

It has been attested by eight patients using the dragon's blood multi-phase spray that compared with the dragon's blood fine spray, the dragon's blood fine multi-phase spray is more convenient and makes wound heal faster and better.

INDUSTRIAL APPLICABILITY

The invention provides a multi-phase material spraying device. Different materials are stored in a plurality of storage chambers in a spraying system, and the materials are sprayed after a uniform mixing or separately to reach a spraying goal. The invention further provides a device for a synergistic application of two kinds of materials insoluble with each other or having poor stability. The device can be used to disperse multi-phase spraying agents, including drugs, disinfectants, pesticides, air fresheners or cosmetics. Volume and costs of these agents are saved accordingly.

This invention is not to be limited to the specific embodiments disclosed herein and modifications for various applications and other embodiments are intended to be included within the scope of the appended claims. While this invention has been described in connection with particular examples thereof, the true scope of the invention should not be so limited since other modifications will become apparent to the skilled practitioner upon a study of the drawings, specification, and following claims.

The invention claimed is:

1. A device for spraying multiple materials, comprising a container comprising at least two storage chambers (1, 2);

a nozzle (15) for spraying the multiple materials;

a pair of material-conveying pipes (12, 13) for delivering the multiple materials to said nozzle (15);

a mixing chamber (14);

a pair of conveying pumps (9, 90) for pumping said multiple materials respectively via said pair of said material-conveying pipes (12, 13) to said nozzle (15); and valves (18, 19, 180, 190) for controlling amount of materials dispensed by each said conveying pump;

wherein a first said conveying pump (9) is a manual pump provided for pumping a first said material via a first said material-conveying pipe (12) to said nozzle (15), and a second said conveying pump is an electric pump (90) provided for pumping a second said material via a second said material-conveying pipe (13) to said nozzle (15);

said manual pump (9) is actuated manually by a trigger (11); and said electric pump (90) is actuated electrically and is turned on and off with a button switch (10), said button switch (10) being disposed on said trigger (11).

2. The device of claim 1, wherein said storage chambers (1, 2) are disposed separately from one another.

3. The device of claim 1, wherein said conveying pumps (9, 90) are metering pumps or non-metering pumps.

4. The device of claim 1, wherein said trigger (11) is a press spring switch.

5. The device of claim 1, wherein said trigger (11) comprises a handle, a spring, and a piston.

6. The device of claim 5, wherein said button switch (10) is connected and to a power supply via electrical wires.

7. The device of claim 1, wherein said valves (18, 19 180, 190) are metering valves or non-metering valves.

8. The device of claim 1, further comprising a selection mechanism having a plurality of settings, said mechanism controlling said valves (18, 180, 19, 190) to switch on separately or simultaneously.

9. The device of claim 1, wherein the multiple materials are of different phases.

10. The device of claim 1, further comprising a selection mechanism disposed out of said cylinder and cooperating with said valves for selecting the amount dispensed by each pump; wherein said selection mechanism has a plurality of gears for controlling said valves (18, 180, 19, 190) to switch on separately.

11. A method for spraying multiple components from the device of claim 1, comprising: filling said two storage chambers (1, 2) each with a different material, and actuating said trigger (11) whereby also actuating said button switch (10) and whereby mixing said materials and then spraying them from said nozzle.

12. The method of claim 11, wherein the materials to be sprayed are therapeutic drugs, disinfectants, pesticides, air fresheners or cosmetics.

13. The method of claim 11, wherein one said material is dragon's blood fine powders or highly concentrated dragon's blood solution, and second said material is 45-95% ethanol by volume or a blocking buffer.

* * * * *